US007942624B1

(12) United States Patent
Erb

(10) Patent No.: US 7,942,624 B1
(45) Date of Patent: May 17, 2011

(54) VERTICAL AXIS WIND GENERATOR

(76) Inventor: John Walter Erb, Guadalupe (CR)

( * ) Notice: Subject to any disclaimer, the term of this patent is extended or adjusted under 35 U.S.C. 154(b) by 181 days.

(21) Appl. No.: 12/387,268

(22) Filed: Apr. 29, 2009

(51) Int. Cl.
*F03D 7/06* (2006.01)

(52) U.S. Cl. .......................................... 415/4.2; 416/41

(58) Field of Classification Search .................. 415/4.2, 415/4.4, 32, 907; 416/41, 48, 49, 138; 290/44, 290/55
See application file for complete search history.

(56) References Cited

U.S. PATENT DOCUMENTS

| | | | |
|---|---|---|---|
| 145,158 A * | 12/1873 | Davie et al. | 415/4.2 |
| 509,866 A * | 12/1893 | Bradford | 416/142 |
| 556,396 A * | 3/1896 | Auld | 416/142 |
| 4,048,947 A | 9/1977 | Sicard | |
| 4,050,246 A | 9/1977 | Bourquardez | |
| 4,113,408 A | 9/1978 | Wurtz et al. | |
| 4,129,787 A | 12/1978 | Palma | |
| 4,178,126 A | 12/1979 | Weed | |
| 4,303,835 A | 12/1981 | Bair | |
| 4,380,417 A | 4/1983 | Fork | |
| 4,410,806 A | 10/1983 | Brulle | |
| 4,424,002 A | 1/1984 | Nishiyama | |
| 4,457,669 A * | 7/1984 | Corry | 416/119 |
| 4,545,729 A * | 10/1985 | Storm | 416/132 B |
| 4,609,827 A | 9/1986 | Nepple | |
| 5,226,806 A | 7/1993 | Lubbers | |
| 7,156,609 B2 | 1/2007 | Palley | |
| 7,462,950 B2 * | 12/2008 | Hu | 290/55 |

* cited by examiner

*Primary Examiner* — Nathaniel Wiehe

(57) ABSTRACT

One embodiment of a vertical axis wind generator having a stationary vertical shaft (10) supporting with bearings (12) a larger diameter rotating shaft (11) attached by radial connections (13) and support connections (15) to circular support members (16), which are joined to equivalently spaced vertical connections (14). Attached by hinges (18) to these vertical connections (14) are plates (17) held to a radial position to the shafts (10),(11), when the wind force is on them, by cables (19) controlled by electronically controlled winches (25) attached to the circular support members (16). The wind force will close the plates on the opposite side, thus not affecting the rotation, which is transmitted through amplifying gears (21) to the generators (21). Magnetic levitation, which includes an aluminum rail (23), as shown in FIG. 4 would raise the vertical axis wind generator negating friction.

1 Claim, 3 Drawing Sheets

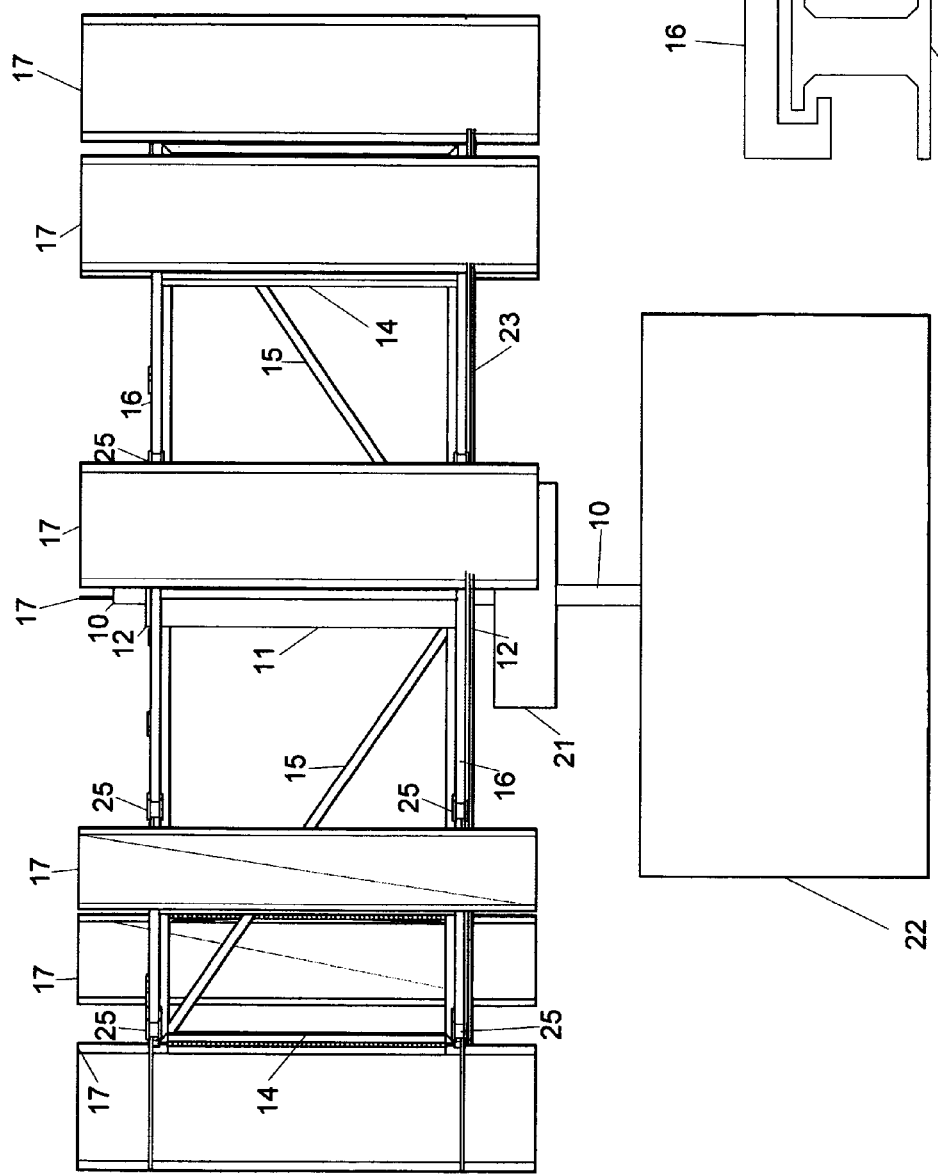
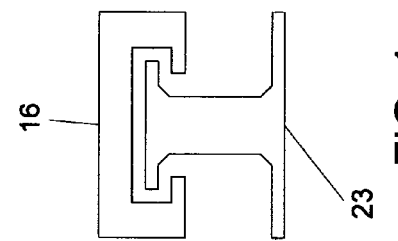

VERTICAL AXIS WIND GENERATOR

CROSS REFERENCED TO RELATED APPLICATIONS

Not Applicable

FEDERALLY SPONSORED RESEARCH

Not Applicable

SEQUENCE LISTING OR PROGRAM

Not Applicable

BACKGROUND

1. Field

This application relates to generation of electricity by a vertical axis wind generator 2. Prior Art Presently, most wind generators are horizontal axis wind generators; they must be tower mounted and require a yaw control system to keep their heavy machine assembly turned into the wind to avoid destruction and maximize their low efficiency, being zero at the hub of the propeller. Thus, both construction and maintenance costs are expensive for horizontal axis wind generators.

Vertical axis wind generators are either fixed vane types with problems when the prevailing wind reverses, and are limited to small diameters. While the moveable vane type employ various wind direction and/or wind velocity sensors. Several examples of sensor use are found in U.S. Pat. Nos. 4,178,126 (1979) Weed, 4,303,835 (1981) Bair, 4,609,827 (1986) Nepple, and 4,410,806 (1983) Brulle.

SUMMARY

In accordance with one embodiment a vertical axis wind generator comprises a stationary vertical shaft supporting with bearings, a larger diameter rotating shaft attached to two parallel circular support members, joined by equivalently separated vertical connections; which have a multitude of plates connected by hinges to them. These plates are restrained by cables between them and the circular support members to a radial position to the shafts when the wind force is on them. The plates on the opposite side of the plates causing rotation from the force of the wind, will close from the force of wind, and not negate the rotation, which is transmitted through amplifying gears to generator(s)

DRAWINGS

Figures

The drawing was made in a 3D modeling CAD-program so any view can appear in the presentation. They are in four figures named FIG. 1, FIG. 2, FIG. 3, and FIG. 4

FIG. 2 is a side view and FIG. 3 is an oblique view and FIG. 4 is a side view. All the figures contain numbers that show the parts of the Vertical Axis Wind Generator.

Said numbers start at ten (10).
The parts re numbered and described as follows:

| | |
|---|---|
| 10. | Support Post |
| 11. | Rotating Post |
| 12. | Bearing |
| 13. | Radial Connection |
| 14. | Vertical Connection |
| 15. | Support Connection |
| 16. | Circular Support Member |
| 17. | Plate |
| 18. | Hinge(s) |
| 19. | Cables |
| 20. | Impact Cushion |
| 21. | Amplifying Gears and Generators |
| 22. | Supporting Base |
| 23. | Aluminum Rail |
| 24. | Brakes |
| 25. | Winches |

DETAILED DESCRIPTION

Figure 1:
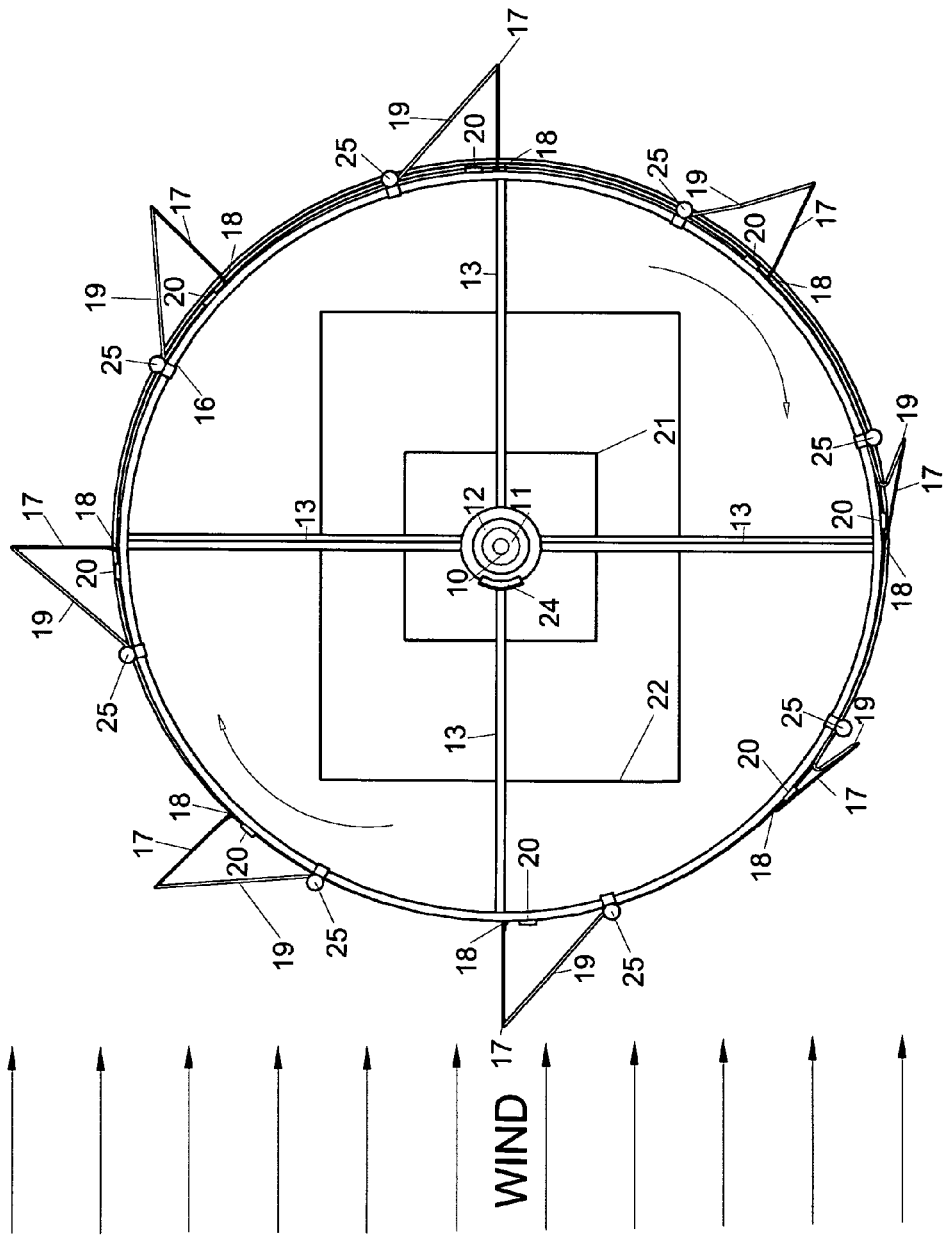
FIG. 1 is a top view and it shows the wind direction and the rotation of the Vertical Axis Wind Generator.
Figure 3:
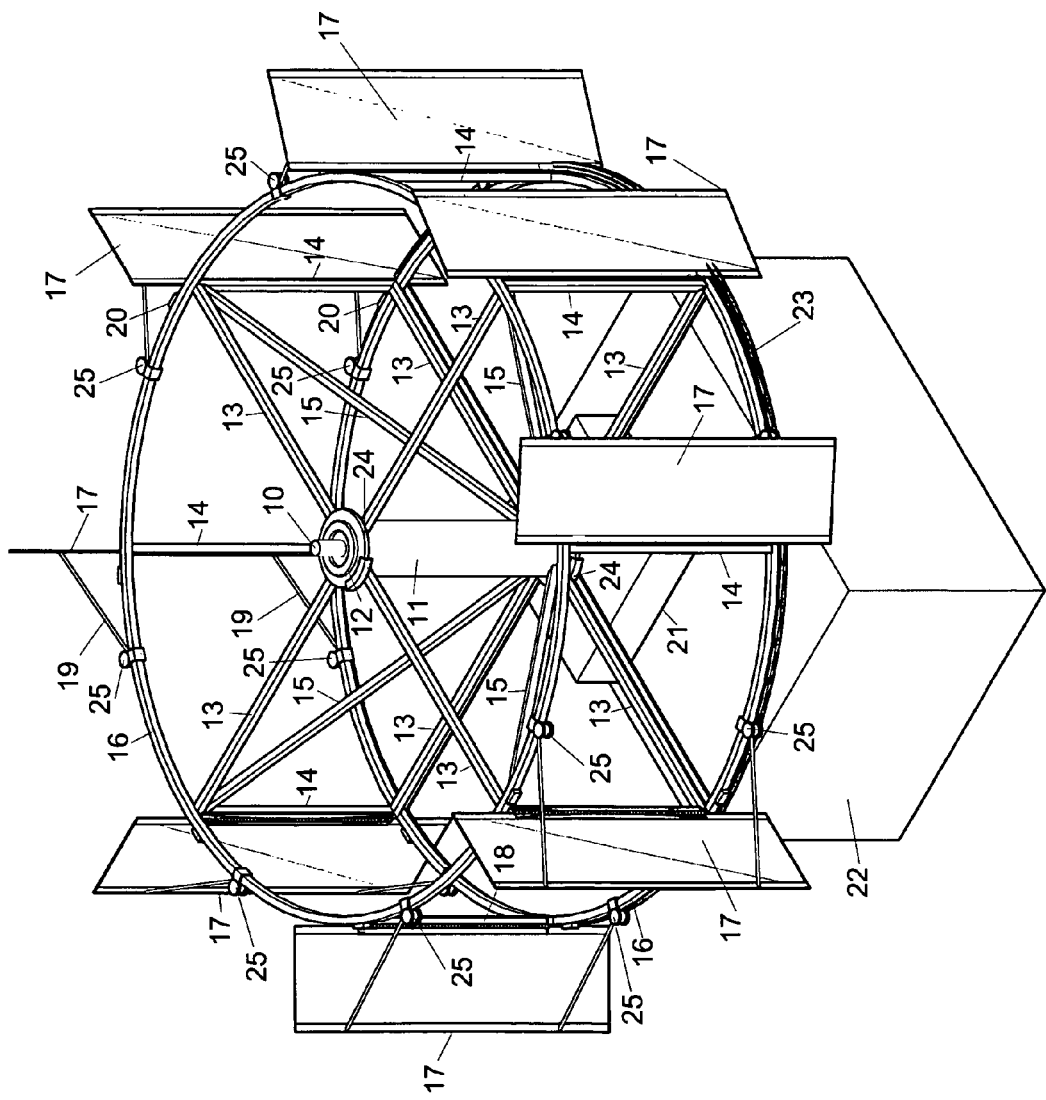

FIGS. 1, 2 and 3

First Embodiment

One embodiment of the rotation of the vertical axis wind generator caused by the force of the wind is illustrated in FIG. 1 (top view). This rotation causes centrifugal force to act on the plates 17, that are attached to vertical connections 14 with hinges 18 to cause them to take a position vertical to center. The formula for centrifugal force is F=WV/gr. The wind equation has a V. Thus, the wind force overcomes the centrifugal force by a factor of V plus centripetal force and closes the plates 17 against impact cushions 20 on the side opposite the wind driven plates 17. The wind driven plates 17 are held in a position radial to center by cables 19 which are attached horizontally to the top and bottom circular support members 16 that are connected to the vertical rotating shaft 11 by radial connections 13, which are strengthened by support connections 15. The rotating shaft 11 is supported by bearings 12 top and bottom, that are attached to the vertical non-rotating shaft 10 secured by supporting base 22, transmits rotation through amplifying gears 21 to generator(s) 21, as shown in FIGS. 1, 2 and 3.

Larger diameters of the vertical axis wind generator would require controls. Winches 25 would incrementally retract cables 19 when optimum velocity is reached. Also, a manual option could retract the plates 17 completely. Magnetic levitation would levitate the bottom ring 16 above the aluminum rail 23. Brakes 24 would be employed when the plates 17 are fully retracted.

FIG. 2

Additional Embodiment

When the diameter of the vertical axis wind generator is in scores to hundreds of feet; additional embodiments would be necessary in order to control the massive wind force transmitted into rotational velocity; including complete cessation of the rotation. The velocity of rotation would be controlled by winches 25 that would electronically retract simultaneously all the cables 19 connecting the plates 17 to the circular support members 16. This retraction would incrementally adjust the plates 17 to positions where the optimum rotational velocity would not be exceeded. An optional manual control could achieve complete cessation of rotation by closing the plates 17 and then applying the brakes 24.

Additionally, magnetic levitation would be installed. An aluminum rail 23 as described In FIG. 2 lies beneath the lower circular support member 16. The magnetic levitation would elevate by 0.6 inch the vertical axis wind generator above the aluminum rail 23. This elevation greatly reduces friction; thus enhancing the efficiency of operation and Also minimizing maintenance.

What is claimed is:

1. A vertical axis wind turbine that is economical to build and scalable from scores to hundreds of feet, comprising
   a. a stationary main vertical support shaft,
   b. a rotating shaft mounted about and supported by said vertical support shaft,
   c. a vertical axis wind turbine rotor provided by two vertically separated equal diameter rings attached to said rotating shaft and to each other by a plurality of equal length vertical connections,
   d. a plurality of plates attached to the vertical connections by hinges and restrained by a plurality of cables attached to said plates,
   e. a gearbox connecting said rotating shaft to an electrical generator to produce electricity,
   f. a plurality of cat-head winches coupled to said cables and mounted to the rings, said winches being independently electrically controlled to incrementally adjust the length of said cables and thereby optimize the open position of the plates and to fully retract said cables so as to place the plates in a fully closed position,
   g. a conducting rail, beneath and contiguous with the lower ring so as to magnetically levitate the wind turbine to reduce friction, and
   h. a brake to cease rotation of said rotating shaft when said plates are in their fully closed position.

* * * * *